United States Patent Office 2,859,214
Patented Nov. 4, 1958

2,859,214

N,N-DISUBSTITUTED-5-DISUBSTITUTED-AMINO-2,3-DIHYDRO-3-FURAMIDES AND THEIR PREPARATION

Benjamin W. Howk, West Chester, Pa., and John C. Sauer, Cragmere, Del., assignors to E. I. du Pont de Nemours & Company, Wilmington, Del., a corporation of Delaware No Drawing. Application August 20, 1956
Serial No. 605,220

13 Claims. (Cl. 260—247.2)

This invention relates to new compositions of matter and to methods for their preparation.

This application is a continuation-in-part of our co-pending application Serial No. 501,748, filed April 15, 1955, now abandoned.

Acetylene is known to form acrylates when it is reacted with carbon monoxide in the presence of stoichiometric amounts of nickel or cobalt carbonyl or with carbon monoxide and an alcohol in the presence of salts of bivalent nickel [Copenhaver and Bigelow, "Acetylene and Carbon Monoxide Chemistry," Reinhold Publishing Co., New York (1949), p. 247]. When the reaction of acetylene with carbon monoxide is effected in an inert organic medium in the presence of a catalytic amount of a cobalt carbonyl the product is no longer an acrylate but a new dilactone (J. C. Sauer, U. S. Ser. No. 432,599, filed May 26, 1954, now abandoned, and of which U. S. patent application Ser. No. 549,155, filed November 25, 1955, is a continuation-in-part. The latter application is now U. S. Patent 2,840,570, issued June 24, 1958.

This invention has as an object the provision of a new process. A further object is the provision of new compounds. Still another object is the preparation of new plasticizers for polymeric plastic materials. Other objects will appear hereinafter.

These objects are accomplished by the present invention of 2,3-dihydrofuranes and the 2-alkyl derivatives thereof, in which the 3-position carries an N-disubstituted carbamoyl group and the 5-position and N-disubstituted amino group in which the substituents are aliphatic in character and may be straight chain or cyclic in which case there can be present in the ring thus formed a heteroatom, in particular oxygen. The objects of this invention are also accomplished by a process of preparing these compounds wherein a tertiary amino-substituted acetylene having one acetylene linkage as its only non-aromatic unsaturation and containing carbon, hydrogen and, optionally, oxygen, and the one tertiary amino nitrogen is reacted with carbon monoxide in amount of at least one mole thereof per mole of the acetylene in an inert reaction medium in the presence of a catalytic amount of a cobalt carbonyl at 60° C. to 175° C.

In practice a pressure reactor is charged with an inert organic liquid reaction medium, a catalytic amount of a cobalt carbonyl and a pre-determined, weighed amount of the tertiary amino-substituted acetylene. The reactor is closed, cooled to 0° C., or lower, and evacuated. The charged reactor is placed in a heated shaker box. Carbon monoxide is introduced to provide at least one mole thereof per mole of the acetylene and the charge is heated and agitated at 60° C. to 175° C., preferably 85° C. to 140° C. These conditions are maintained until there is no further pressure drop. Throughout the reaction period, the pressure within the reactor is maintained at the level developed at reaction temperature by periodic injection of carbon monoxide. After reaction is complete the reactor is permitted to cool, opened, the contents discharged and distilled to remove unreacted tertiary amino-substituted acetylene and to isolate the desired reaction product.

The following examples are illustrative of the invention.

EXAMPLE I

Into a shaker tube there were charged 88.8 g. of 3-N-diethylaminopropyne (B. P. 119° C., $n_D^{25}$, 1.4292), 100 ml. of acetone, and 2 g. of dicobalt octacarbonyl. The reactor was closed, cooled in solid carbon dioxide/acetone, and evacuated. Carbon monoxide was then pressured into this vessel at 800 to 900 atmospheres while maintaining a temperature of 96° C. to 113° C. during a period of 6.8 hours. The pressure vessel was then cooled to room temperature and opened. The reaction mixture was removed from the vessel and distilled at 20–40 mm. in a water bath at 60° C. until the acetone solvent and unreacted N-diethylamino-propyne had been all removed. A viscous residue remained in the distillation vessel.

The viscous residue, on distillation, yielded 19.5 grams of a liquid which boiled at 130 to 133° C. at 1 mm. pressure, had a refractive index ($n_D^{25}$) of 1.4933 and a density of 0.9962 at 25° C. The fraction boiling at 130 to 133° C. at 1 mm. was found by analysis to have the empirical formula $C_{13}H_{24}O_2N_2$.

*Analysis*

|  | Found | Calculated |
| --- | --- | --- |
| Percent Carbon | 64.88 | 65.00 |
| Percent Hydrogen | 10.06 | 10.00 |
| Percent Nitrogen | 11.50 | 11.60 |
| Hydrogen No | 0.0084 | 0.0083 |
| Mol. Refraction | 70.1 | 69.4 |
| Sap. No | 0 | 0 |
| Molecular Weight | 240.245 | 240 |
| Carbonyl No | 0 | 0 |

The infrared absorption spectrum, which showed strong absorption at 6.15μ, indicated the presence of tertiary amido carbonyl groups.

The foregoing data, nuclear magnetic resonance studies, and the reactions reported below show that the $C_{13}H_{24}O_2N_2$ compound is N,N-diethyl-5-diethylamino-2,3-dihydro-3-furamide.

The above-mentioned compound was also characterized by the preparation of derivatives. The compound was dissolved in dioxane and hydrogenated at room temperature and atmospheric pressure with a palladium-on-carbon catalyst. The hydrogenation product, obtained in 90% yield, distilled at 138° C. at 2 mm. pressure and had an $n_D^{25}$ of 1.4726. Infra-red analysis of the reduced product was identical with that of the bisdiethylamide,

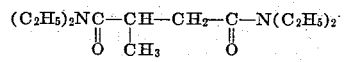

obtained independently from methylsuccinic acid. The hydrogenated product analyzed as follows:

*Analysis.*—Calculated for $C_{13}H_{26}O_2N_2$: C, 64.5%; H, 10.7%; N, 11.5%. Found: C, 64.2%; H, 10.6%; N, 11.0%.

The hydrogenated product was also hydrolyzed in concentrated hydrochloric acid to methylsuccinic acid (confirmed by mixed melting point with an authentic sample of the acid).

Twelve grams of the amide of Example I was dissolved in 30 ml. of dioxane. To this solution, there was added 5 g. of copper chromite and the mixture hydrogenated under 2500 to 3000 lbs./sq. in. pressure for two hours at 260° C. The hydrogenated product was removed from the reactor and filtered to remove the catalyst. The dioxane was removed and the residual liquid distilled at 48° C. to 84° C. under 0.4 mm., largely at 79° C. to 84° C. under 0.4 mm. pressure. The product amounted to 6 g. Redistillation of this product gave a fraction boiling at 112° C. to 115° C. under 2 mm. pressure which had an $n_D^{25}$ of 1.4553 and analyzed as follows:

*Analysis.*—Calculated for

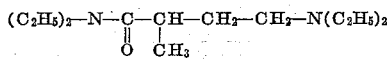

$C_{13}H_{28}ON_2$: C, 68.30%; H, 12.20%; N, 12.20%; N. E., 228. Found: C, 67.74%; H, 11.78%; N, 11.94%; N. E., 214.

Infrared examination of the hydrogenated product showed the presence of the carbonamide group. Since the infrared spectrum does not distinguish conclusively between straight chain and branched chain structures, the nuclear magnetic resonance spectrum of the compound was studied. This spectrum showed presence of five methyl groups as required by the above structure.

Chemical reduction of the amide obtained in Example I was studied to obtain further confirmation of the structure of the product. Fifteen grams of the amide of Example I was dissolved in 200 ml. of absolute ethyl alcohol. Metallic sodium was added in small portions, with stirring and heating, until 26 g. of sodium had been added. An additional 100 ml. of absolute ethyl alcohol was added to complete solution of all of the sodium. After the mixture had cooled to room temperature, it was poured into 250 ml. of water. The mixture was made slightly acidic with glacial acetic acid and then extracted several times with ether. Removal of the ether followed by distillation gave 8 grams of the bisdiethylamide of methylsuccinic acid.

An improved yield of the product of Example I was obtained by a modified procedure described in Example II.

EXAMPLE II

Under conditions similar to those described in Example I, 150 ml. of acetone, 1 g. of dicobalt octacarbonyl and 25 g. of 3-N-diethylaminopropyne were charged into a shaker tube. Carbon monoxide was injected at 260–1000 atmospheres during 15.3 hours at 120–127° C. The pressure vessel was then cooled to room temperature and opened. The reaction mixture was poured into approximately 500 ml. of hexane to precipitate 10 g. of dark solid which was removed by filtration. The filtrate was evaporated to remove hexane and acetone, leaving an oil which was fractionated under reduced pressure. In this way 10 g. of the product of Example I, N,N-diethyl-5-diethylamino-2,3-dihydro-3-furamide, boiling 124–128° C./0.28 mm., $n_D^{25}$ 1.4921, was obtained.

EXAMPLE III

A bomb with stainless steel lining was charged with 165 grams of diethylamine and 15 grams of cuprous chloride. Acetylene was pressured into the bomb at 90–190 p. s. i. over a period of 17.8 hours at a reaction temperature which was gradually increased from 20 to 85° C. The reaction mixture was filtered and the filtrate distilled. There was obtained 144 grams of 3-diethylamino-3-methyl-1-propynl, boiling at 125 to 126° C., $n_D^{25}$, 1.4271.

Under conditions similar to those described in Example I, 125 ml. of acetone, 2 g. of dicobalt octacarbonyl and 71 g. of 3-diethylamino-3-methyl-1-propyne were charged into a shaker tube. Carbon monoxide was injected into the reactor to a pressure of 800 to 1000 atmospheres at 97° C. to 104° C. These conditions were maintained for 16.3 hours. From the reaction mixture there was recovered, by distillation, 23.6 g. of the starting aminoacetylene. From the viscous residue there was obtained by distillation, 20 g. of N,N-diethyl-5-diethylamino-2-methyl-2,3-dihydro-3-furamide which boiled at 120° C. at 2 mm. and had an $n_D^{25}$ of 1.4876.

*Analysis.*—Calculated for $C_{14}H_{26}O_2N_2$: C, 66.3%; H, 10.3%; N, 10.9%. Found: C, 66.4%; H, 10.3%; N, 10.3%.

This compound was hydrogenated with a palladium-on-carbon catalyst to the bis-diethylamide

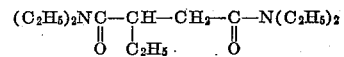

Hydrolysis in strong hydrochloric acid gave ethylsuccinic acid (confirmed by a mixed melting point with an authentic sample of the acid).

EXAMPLE IV

Under conditions similar to those described in Example I, 100 ml. of acetone, 40 g. of 3-N-dimethylaminopropyne (B. P. 78° C.–80° C., $n_D^{25}$, 1.4113) and 1.5 g. of dicobalt octacarbonyl were charged in a shaker tube. Carbon monoxide was injected at 840–980 atmospheres during 16.7 hours at a temperature of 99° C. to 101° C. From the reaction mixture there was obtained 2.5 g. of a product, B. P. 122° C.–134° C./4 mm., $n_D^{25}$, 1.5155 and having spectral characteristics in the infrared corresponding to those of the product in Example I.

EXAMPLE V

A better yield of the product of Example IV was obtained by repeating the reaction as follows: 100 ml. acetone, 2 g. of dicobalt octacarbonyl and 71.5 g. of 3-N-dimethylaminopropyne were charged into a shaker tube. Carbon monoxide was injected at 855–990 atmospheres during 15.5 hours at 99–101° C. From the reaction mixture there was obtained 17 g. of crude product distilling at 114–140° C./5–7 mm. This distillate solidified upon standing and a portion was recrystallized from an ethyl acetate/petroleum ether solvent, M. P. 71–73° C.

*Analysis.*—Calculated for $C_9H_{16}O_2N_2$: C, 58.7%; H, 8.7%; N, 15.2%; $H_2$ No., 0.0108. Found: C, 58.1%; H, 8.7%; N, 15.11%; $H_2$ No., 0.0090, 0.0089.

The infrared spectrum was in agreement with the N,N-dimethyl-5-dimethylamino-2,3-dihydro-3-furamide structure.

EXAMPLE VI

Under conditions similar to those of Example I, 100 ml. of xylene, 57 g. of 3-N-diethylaminopropyne, and 2.0 g. of dicobalt octacarbonyl were charged into a shaker tube. Carbon monoxide was injected into the reactor to a pressure of 675 to 1000 atmospheres at 106° C. to 115° C. These conditions were maintained for 16.3 hours. From the reaction mixture there was obtained, by distillation, 6.5 g. of a product boiling at 133° C./1 mm., $n_D^{25}$, 1.4929.

EXAMPLE VII

A reaction vessel was charged with 123 grams of 37% aqueous formaldehyde and 131 grams of morpholine added dropwise with vigorous stirring. The temperature of the reaction mixture was maintained below 35° C. The mixture was placed in a pressure vessel, 10 grams of cuprous chloride were added and the vessel was closed. It was cooled with carbon dioxide/acetone solution and held under reduced pressure to free it of air. Acetylene was then pressured into the vessel at 25 to 275 p. s. i. for a period of 8 to 10 hours at 20 to 80° C. The pressure vessel was cooled to room temperature, opened and the reaction mixture filtered. Distillation of the filtrate yielded a clear liquid which, after saturation with solid potassium carbonate, gave a separate layer of organic liquid. This layer was removed, dried with solid potassium carbonate and distilled. The compound, 3-(4-morpholino)-1-propyne, was obtained in 66% yield and boiled at 89 to 92° C. at 38 mm. pressure; $n_D^{25}$, 1.4723. Analytical data obtained on the compound are:

Calculated for $C_7H_{11}NO$: C, 67.17%; H, 8.86%; N, 11.19%; mol. wt., 125. Found: C, 67.75%; H, 8.85%; N, 10.90%; mol. wt., 126.

Under conditions similar to those described in Example I, 150 ml. of acetone, 1 g. of dicobalt octacarbonyl and 15 g. of 3-(4-morpholino)-1-propyne were charged into a shaker tube. Carbon monoxide was injected at 530 to 1000 atmospheres during 18.3 hours at 124–127° C. The pressure vessel was then cooled to room temperature and opened. The reaction mixture was poured into approximately 500 ml. of diethyl ether to separate an oil from which the ether was removed by decantation. Evaporation of the ether gave another oil which was fractionated under reduced pressure. A viscous liquid, boiling 182–192° C./0.6 mm., was obtained in 24% yield. This liquid was identified as the morpholine amide of 5-(4-morpholino)-2,3-dihydro-3-furoic acid by comparison of its infrared spectrum with the infrared spectrum of Example I and by analytical results.

*Analysis.*—Calculated for $C_{13}H_{20}N_2O_4$: C, 58.19%; H, 7.51%; N, 10.44%; mol. wt., 268. Found: C, 58.90%, 58.80%; H, 7.67%, 7.77%; N, 10.01%, 10.08%; mol. wt., 246, 246.

EXAMPLE VIII

Under conditions similar to those described in Example I, 150 ml. of acetone, 1 g. of dicobalt octacarbonyl, and 25 g. of 3-(4-morpholino)-3-methyl-1-propyne were charged into a shaker tube. Carbon monoxide was injected at 580 to 1010 atmospheres during 15.5 hours at 122–127° C. An isolation procedure similar to that given in Example V, using hexane instead of diethyl ether, gave a very viscous oil which was purified by distillation. The product was identified by its infrared spectrum as the morpholine amide of 5-(4-morpholino)-2-methyl-2,3-dihydro-3-furoic acid.

Additional examples of compounds of this invention and the propynes from which they have been prepared are as follows: N,N-dibutyl-5-dibutylamino-2-methyl-2,3 - dihydro - 3 - furamide from 3 - dibutylamino - 3-methyl - propyne; N,N - dimethyl - 5 - dimethylamino-2 - methyl - 2,3 - dihydro - 3 - furamide from 3 - dimethylamino - 3 - methyl - propyne; 1 - (5 - piperidino-2 - methyl - 2,3 - dihydro - 3 - furoyl)piperidine from 3-(1-piperidino)-3-methyl-propyne.

As shown in Example I, hydrogenation of the unsaturated amides of this invention results in absorption of one mole of hydrogen per mole of amide, with the formation of a saturated amide. The spectral and analytical data, and the derivatives obtained by hydrogenation show that the products of this invention are N,N - disubstituted - 5 - disubstituted - amino - 2,3 - dihydro - 3 - furamides, such as N,N - dialkyl - 5 - dialkylamino-2,3-dihydro-3-furamides, which can be represented by the following structure:

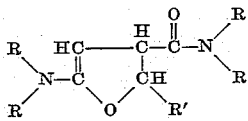

where each R is a monovalent hydrocarbon radical free from non-aromatic unsaturation which may be joined together directly or through ether oxygen, thus forming a heterocyclic ring of aliphatic character and of not more than six members and R′ is hydrogen or an alkyl radical. The R and R′ groups will be the same as those present in the tertiary amino-substituted acetylene used as a starting material; they will preferably be saturated groups of not more than 4 carbon atoms.

The present invention is generic to the reaction of carbon monoxide in the presence of a cobalt carbonyl catalyst with a tertiary amino-substituted acetylene having the acetylenic linkage as its only non-aromatic unsaturation and containing only carbon, hydrogen, the one amino nitrogen and, at most, one oxygen and that an ether oxygen. In these acetylenes the carbon to which the tertiary amino nitrogen is attached is directly linked to a carbon triply bonded to hydrogen-bearing carbon. Examples of acetylenes of this type are 3-(N-dimethylamino)propyne - 1, 3 - (N - dipropylamino)propyne-1, 3-(N-didodecylamino)-butyne-1, 3-(N-diphenylamino)-propyne-1, 3-(N-ditolylamino)-propyne-1, 3-(N-dibenzylamino)-propyne - 1, 3 - (N - dicyclohexylamino)-propyne-1, 3-(N-methylphenylamino)-propyne-1, and the like. The preferred tertiary amino-substituted acetylenes are the 3-dialkylamino-1-alkynes wherein the alkyl groups are of up to eight carbons and the alkyne moiety is of up to four carbons and particularly the 3-(N-dialkylamino)-propynes in which each alkyl group contains from 1 to 4 carbon atoms because of their availability and reactivity.

The reaction is conducted under pressure, normally carbon monoxide pressure, and reaction is continued until there is no further pressure drop. This may require from 8 to 20 hours. Throughout the reaction period the pressure within the reactor is maintained by periodic injection of carbon monoxide. Pressures above 50 atmospheres, preferably above 300 atmospheres, are desirable.

The reaction between the tertiary amino-nitrogen-substituted acetylene and the carbon monoxide is carried out in the presence of an inert organic medium, i. e., an organic liquid which contains no active hydrogen, as determined by the Zerewitinoff method [Ber. 40, 2026 (1907); J. Am. Chem. Soc. 49, 3181 (1927); Siggia, Quantitative Organic Analysis Via Functional Groups, 2nd ed. (1954), chapter VII, p. 78]. Specific media of this type include isooctane, toluene, acetonitrile, acetone, methyl ethyl ketone, ethyl acetate, dioxane, diethyl ether, xylene, benzene, etc.

The amount of reaction medium is not critical. Usually an amount is employed which is at least equal to the weight of the acetylene charged into the reactor. An amount in excess of four times the weight of the acetylene is generally not employed because it does not seem to have any practical advantages.

The cobalt carbonyl catalyst may be preformed or may be formed in situ by reaction of carbon monoxide with cobalt or a cobalt compound capable of forming the carbonyl under the conditions of reaction. Examples of such cobalt compounds are the acetate, acetonylacetate, etc. The preparation of the cobalt carbonyl by reaction of carbon monoxide with the metal in reactive form is conducted as described in J. Am. Chem. Soc. 70, 383–6 (1948). The amount of catalyst is at least 0.01% and preferably from 1 to 15% by weight of the acetylene charged into the reactor.

By virtue of their polyfunctional nature, the unsaturated amides of this invention are versatile chemical intermediates. As shown previously, valuable amides of dibasic acid and basic branched chain amides of monobasic amides can be obtained by reduction of the unsaturated dihydrofuramides of this invention.

The products of this invention are useful as softeners and plasticizers for polymeric materials. This use is illustrated in the following examples.

Three grams of polyvinyl chloride was dissolved in 47 g. of cyclohexanone. To 40 g. of this solution there was added 1 g. of the product of Example I. A film cast from this solution was clear, tough, and orientable, after removal of the solvent. Analysis of the film showed it to contain 27.5% of the product of Example I.

A film of the same polyvinyl chloride, similarly prepared, but without modification with the product of Example I was brittle.

Following the procedure described above, a film of polymethyl methacrylate containing 28.6% of the product of Example I was cast from toluene solution. The film was clear, tough, and flexible. An unmodified polymethyl methacrylate film, similarly prepared, was brittle.

A polyacrylonitrile film containing 25% of the product of Example I was cast from solution in dimethyl formamide. The film was clear, tough, and flexible. In contrast, an unmodified polyacrylonitrile film, similarly prepared, was opaque and brittle.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. An N,N - disubstituted - 5 - disubstituted - amino- 2,3-dihydro-3-furamide having the formula

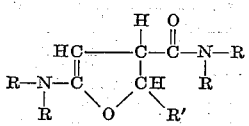

wherein the R substituents on each nitrogen atom are selected from the class consisting of alkyl of not more than 12 carbon atoms, cyclohexyl, phenyl, benzyl, tolyl, saturated aliphatic hydrocarbon radicals which are directly joined together and form with the nitrogen to which they are bonded an unsubstituted piperidine ring, and saturated aliphatic hydrocarbon radicals which are joined through ether oxygen and form with the nitrogen to which they are bonded an unsubstituted morpholine ring, and R' is selected from the class consisting of hydrogen and alkyl radicals of not more than 4 carbon atoms.

2. An N,N - dialkyl - 5 - dialkylamino - 2 - alkyl - 2,3- dihydro-3-furamide having the formula

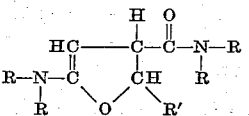

wherein each R is alkyl of not more than 4 carbon atoms and R' is alkyl of not more than 4 carbon atoms.

3. An N,N - dialkyl - 5 - dialkylamino - 2,3 - dihydro- 3-furamide having the formula

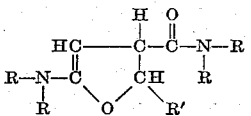

wherein each R is alkyl of not more than 4 carbon atoms and R' is hydrogen.

4. N,N - diethyl - 5 - diethylamino - 2,3 - dihydro - 3- furamide.

5. N,N - diethyl - 5 - diethylamino - 2 - methyl - 2,3- dihydro-3-furamide.

6. N,N - dimethyl - 5 - dimethylamino - 2,3 - dihydro- 3-furamide.

7. The morpholine amide of 5-(4-morpholino)-2,3- dihydro-3-furoic acid.

8. The process for preparing an N,N-disubstituted-5- disubstituted-amino-2,3-dihydro-3-furamide which comprises reacting, in an inert liquid organic reaction medium at 60° C.–175° C. under a pressure of at least 50 atmospheres and in the presence of a catalytic amount of cobalt carbonyl, at least one mole of carbon monoxide per mole of 3-tertiary-amino-1-alkyne in which one of the acetylenically unsaturated carbon atoms is bonded to hydrogen and the other acetylenically unsaturated carbon atom is bonded to a carbon atom having one of its valences satisfied by hydrogen, another of its valences satisfied by a member selected from the class consisting of hydrogen and alkyl radicals of not more than 4 carbon atoms, and its remaining valence satisfied by radicals selected from the class consisting of the morpholino radical, the piperidino radical, and tertiary-amino nitrogen having two of its valences satisfied by radicals selected from the class consisting of alkyl of not more than 12 carbon atoms, cyclohexyl, phenyl, benzyl and tolyl.

9. The process for preparing an N,N-dialkyl-5-dialkyl- amino-2,3-dihydro-3-furamide which comprises reacting, in an inert liquid organic reaction medium at 60° C.– 175° C. under a pressure of at least 50 atmospheres and in the presence of a catalytic amount of cobalt carbonyl, at least one mole of carbon monoxide per mole of 3-tertiaryamino-1-alkyne in which one of the acetylenically unsaturated carbon atoms is bonded to hydrogen and the other acetylenically unsaturated carbon atom is bonded to a carbon atom having two of its valences satisfied by hydrogen, and its remaining valence satisfied by a tertiary-amino nitrogen having two of its valences satisfied by alkyl radicals each of not more than 4 carbon atoms.

10. The process for preparing an N,N-dialkyl-5-di- alkylamino-2-alkyl-2,3-dihydro-3-furamide which comprises reacting, in an inert liquid organic reaction medium at 60° C.–175° C. under a pressure of at least 50 atmospheres and in the presence of a catalytic amount of cobalt carbonyl, at least one mole of carbon monoxide per mole of 3-tertiary-amino-1-alkyne in which one of the acetylenically unsaturated carbon atoms is bonded to hydrogen and the other acetylenically unsaturated carbon atom is bonded to a carbon atom having one of its valences satisfied by hydrogen, another of its valences satisfied by an alkyl radical of not more than 4 carbon atoms, and its remaining valence satisfied by a tertiary-amino nitrogen having two of its valences satisfied by alkyl radicals each of not more than 4 carbon atoms.

11. Process for preparing N,N-dimethyl-5-dimethyl- amino-2,3-dihydro-3-furamide which comprises reacting, 3-(N-dimethylamino)-1-propyne with at least one mole, per mole of propyne, of carbon monoxide, in an inert liquid organic reaction medium at 60° C.–175° C. under a pressure of at least 50 atmospheres and in the presence of a catalytic amount of cobalt carbonyl.

12. Process for preparing the morpholine amide of 5-(4-morpholino)-2,3-dihydro-3-furoic acid which comprises reacting 3-(4-morpholino)-1-propyne with at least one mole, per mole of propyne, of carbon monoxide in an inert liquid organic reaction medium at 60° C.– 175° C. under a pressure of at least 50 atmospheres and in the presence of a catalytic amount of cobalt carbonyl.

13. The process for preparing N,N-diethyl-5-diethyl- amino-2,3-dihydro-3-furamide which comprises reacting 3-(N-diethylamino)-1-propyne with at least one mole, per mole of the propyne, of carbon monoxide in an inert liquid organic reaction medium at 60° C.–175° C. under a pressure of at least 50 atmospheres and in the presence of a catalytic amount of cobalt carbonyl.

References Cited in the file of this patent

UNITED STATES PATENTS 2,562,393   Reppe _____ July 31, 1951

FOREIGN PATENTS 851,339   Germany _____ Oct. 2, 1952

OTHER REFERENCES

Reppe et al.: "Liebigs Annalen," vol. 582 (1953), pages 142 and 160.

Reppe: "Acetylene Chemistry," PB–Report 18852S (1949), pp. 74–80.